(No Model.)

J. B. RHODES.
LOOSE PULLEY LUBRICATOR.

No. 414,888. Patented Nov. 12, 1889.

Witnesses:
Walter S. Hood
Joseph F. Phillips

Inventor.
Jay B. Rhodes
By Lucius C. West
Atty

UNITED STATES PATENT OFFICE.

JAY B. RHODES, OF KALAMAZOO, MICHIGAN, ASSIGNOR OF ONE-HALF TO JOSEPH F. PHILLIPS, OF SAME PLACE.

LOOSE-PULLEY LUBRICATOR.

SPECIFICATION forming part of Letters Patent No. 414,888, dated November 12, 1889.

Application filed July 27, 1889. Serial No. 318,931. (No model.)

*To all whom it may concern:*

Be it known that I, JAY B. RHODES, a citizen of the United States, residing at Kalamazoo, county of Kalamazoo, State of Michigan, have invented a new and useful Loose-Pulley Lubricator, of which the following is a specification.

This invention has for its object to provide a loose pulley with a series of interior channels to receive the lubricant, and to construct and mount upon the shaft by the side of the loose pulley a lubricator having an oil-passage registering with said series of channels, all as more fully described below.

Figure 1:
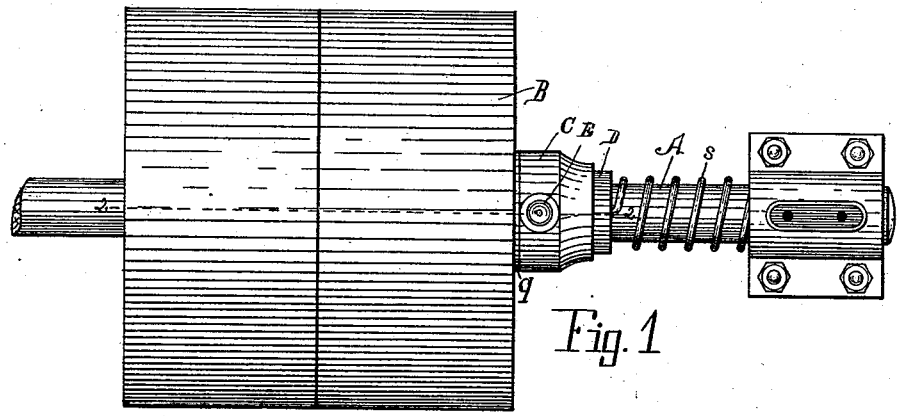
Figure 2:
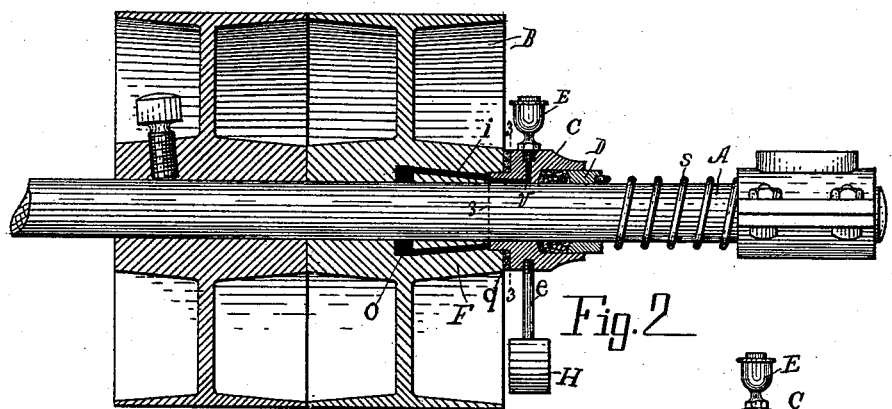
Figure 3:
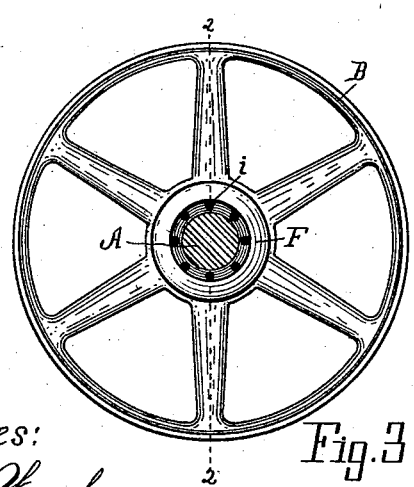
Figure 4:
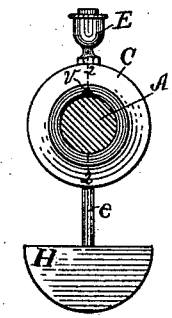

In the drawings forming a part of this specification, Figure 1 is a plan view; Fig. 2, a sectional elevation on line 2 2 in Figs. 1, 3, and 4; Fig. 3, an elevation of loose pulley, looking from a point at the right in Figs. 1 and 2, with shaft in section on line 3 3 3 in Fig. 2; and Fig. 4 is a section on line 3 3 3 in Fig. 2, looking from a point at the left.

Referring to the lettered parts of the drawings, A is a shaft, and B a loose pulley on said shaft by the side of a keyed pulley in the ordinary manner. The center core of the loose pulley B is bored out larger at one end of the hub, the right-hand end in Fig. 2, so as to receive a tenoned end of the collar C. Between the end of the pulley-hub and the shoulder of the collar C and on the round tenoned portion of said collar is preferably placed a leather washer *q*. The collar C is loose on the shaft A, and is provided with an oil-cup at the top at E. Leading from the oil-cup is an oil-passage *v*, which enters the interior of the collar and extends to the end toward the pulley B. Approximately central in the pulley is a circular channel O—that is, it circles around the shaft and is cut into the interior periphery of the hub of the pulley. A series of oil-passages *i* around the interior of the hub of the pulley extend from the end next to the collar C (so as to register with the oil-passage *v* in said collar) back into the central channel O, Figs. 2 and 3. These passages *i* are inclined outwardly from the interior of the hub of the pulley as they approach the channel O. The object of this is as follows: When the pulley B is revolving, first one of the passages *i* and then another temporarily registers with the passage *v*, which is always full of oil, and hence the passages *i* receive oil from said passage *v*. Owing to the incline of the passages *i*, the oil is carried by centrifugal force through said passages into the channel O, and the oil from said channel lubricates the shaft both ways. The passages *i* may, if desired, open throughout their length into the interior of the pulley-hub; but I prefer they shall be holes, as here shown. The collar C is prevented from revolving with the pulley by a balancing-weight H, attached by rod *e* to said collar at the lower side, Figs. 2 and 4.

To prevent the oil from working out of the collar in the wrong direction, I employ a stuffing-box D, loose on shaft A, Fig. 2. This stuffing-box is kept in place by a spring S between it and the bearing-box at the end of the shaft, as in Figs. 1 and 2. This spring, also, by its pressure on the stuffing-box and the pressure of the latter on the collar C, keeps said collar close against the pulley B.

Having thus described my invention, what I claim, and desire to secure by Letters Patent of the United States, is—

1. The combination of a loose pulley having the internal channel and the inclined passages leading from the end of the pulley-hub into said channel, the collar having the oil-cup, and passage leading from said cup to the outer ends of said channels, and a spring exerting a pressure on said collar to keep it in contact with the end of the pulley-hub, substantially as set forth.

2. The combination of a loose pulley having the internal channel and inclined passages leading from the end of the pulley-hub into said channel, a collar loose on the shaft side of the pulley and having the oil-cup on top, the balancing-weight below, and the passage leading from said cup to the ends of said inclined passages, and a spring exerting a pressure against the collar to keep it in contact with the hub of the pulley, substantially as set forth.

3. The combination of a loose pulley having the internal channel and inclined passages leading from the end of the pulley-hub into said channel, the collar loose on the shaft side of the pulley, said collar having an oil-cup and a passage, the latter leading from said cup to said inclined passages in the pulley-hub, and a balancing-weight to keep the oil-cup uppermost, a stuffing-box to the outer end of said collar loose on the shaft, and a spring exerting a direct pressure against said stuffing-box, and thus an indirect pressure against the collar, substantially as set forth.

4. The combination of a loose pulley having the internal channel and oil-passages leading into it, the core at the end of the pulley-hub being enlarged, the balanced collar loose on the shaft side of the pulley, said collar having an oil-cup and a passage, the latter leading from said cup to the inclined passages of the pulley-hub and the tenoned end loose in the enlargement of the core of said hub, and a spring keeping said collar in contact with the pulley-hub, substantially as set forth.

In testimony of the foregoing I have hereunto subscribed my name in presence of two witnesses.

JAY B. RHODES.

Witnesses:
 JOSEPH F. PHILLIPS,
 WILL ORMSBEE.